United States Patent
Hoelsaeter et al.

(10) Patent No.: US 6,873,491 B2
(45) Date of Patent: Mar. 29, 2005

(54) CARTRIDGE ORIENTATION APPARATUS FOR CARTRIDGE STORAGE MAGAZINES AND METHOD

(75) Inventors: Haavard Hoelsaeter, Oslo (NO); Truls Simenson, Hagan (NO)

(73) Assignee: Tandberg Data ASA, Oslo (NO)

( * ) Notice: Subject to any disclaimer, the term of this patent is extended or adjusted under 35 U.S.C. 154(b) by 184 days.

(21) Appl. No.: 10/211,456

(22) Filed: Aug. 2, 2002

(65) Prior Publication Data

US 2003/0112550 A1 Jun. 19, 2003

Related U.S. Application Data

(60) Provisional application No. 60/341,418, filed on Dec. 13, 2001.

(51) Int. Cl.⁷ .............................................. G11B 15/68
(52) U.S. Cl. ...................................................... 360/92
(58) Field of Search ...................... 360/92, 96.5, 97.01, 360/97.03

(56) References Cited

U.S. PATENT DOCUMENTS

| | | | |
|---|---|---|---|
| 5,247,406 A | | 9/1993 | Apple et al. |
| 5,508,859 A | * | 4/1996 | Hu et al. .................... 360/92 |
| 5,621,586 A | | 4/1997 | Hinnen et al. |
| 5,781,368 A | * | 7/1998 | Kotaki et al. ................ 360/92 |
| 5,933,396 A | | 8/1999 | Hammar et al. |
| 5,940,243 A | | 8/1999 | Kanetsuku et al. |
| 6,144,520 A | | 11/2000 | Yamakawa et al. |
| 6,396,656 B1 | | 5/2002 | Satou |

FOREIGN PATENT DOCUMENTS

| | | |
|---|---|---|
| EP | 0 621 594 A2 | 10/1994 |
| EP | 0 622 796 A2 | 11/1994 |
| EP | 1 107 245 A1 | 6/2001 |
| WO | WO 98/49682 | 11/1998 |

OTHER PUBLICATIONS

Japanese Abstract, Publication No. 200187958, Publication Date Apr. 7, 2000.

* cited by examiner

*Primary Examiner*—Allen Cao
(74) *Attorney, Agent, or Firm*—Schiff Hardin LLP

(57) ABSTRACT

A cartridge handling apparatus includes cartridge storage magazines which define cartridge storage slots therein. A projecting element positioned on a back inside wall of each of the storage slots of the storage magazines fits into a recess in the cartridge when the cartridge is oriented in a proper orientation so as to permit the cartridge to be fully inserted into the storage slot in the proper orientation. The projection prevents full insertion of the cartridge in the cartridge storage slot when the cartridge is not in the proper orientation. By changing the orientation of the projection, the storage slot accepts cartridges in a different orientation as the proper orientation. A snap lock is provided on each of the storage slots to engage the cartridge when fully inserted therein.

8 Claims, 4 Drawing Sheets

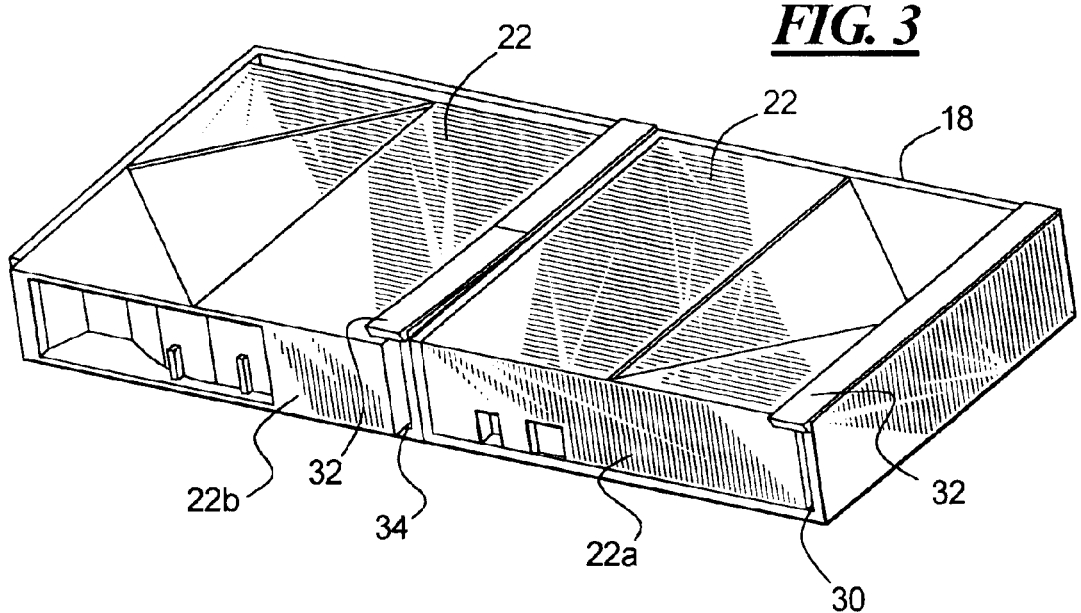
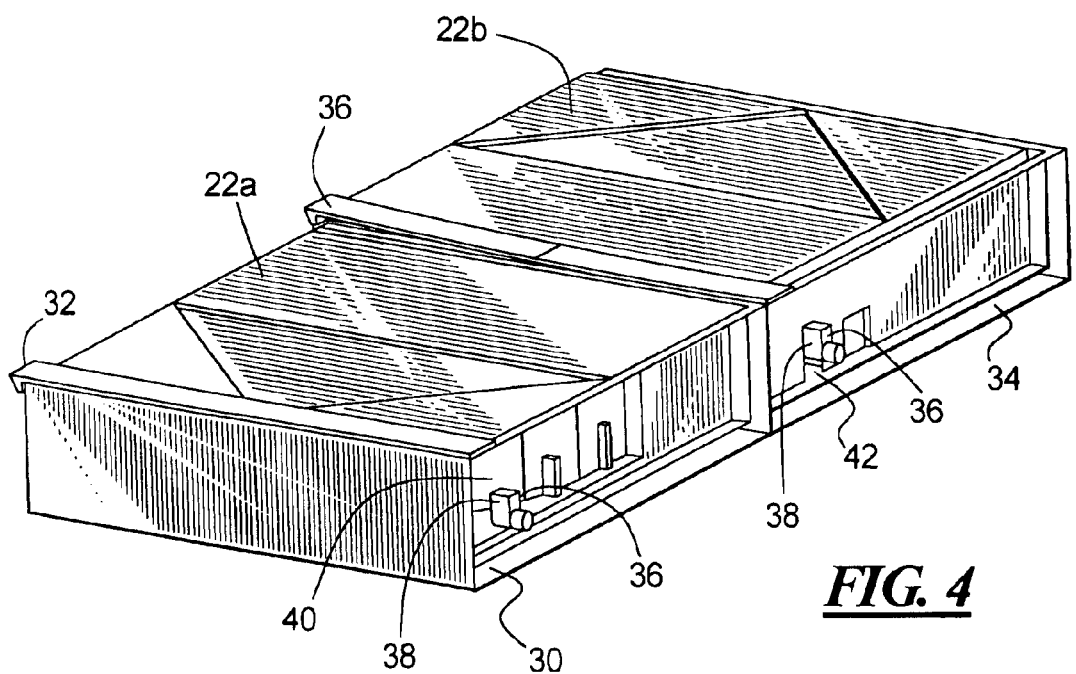

CARTRIDGE ORIENTATION APPARATUS FOR CARTRIDGE STORAGE MAGAZINES AND METHOD

CROSS REFERENCE TO RELATED APPLICATION

This application claims the benefit of Provisional Patent Application Ser. No. 60/341,418, filed Dec. 13, 2001.

BACKGROUND OF THE INVENTION

1. Field of the Invention

The present application relates generally to storage magazines for storing cartridges, and in particular to an apparatus for assuring a predetermined orientation of a cartridge in the storage magazine, for example, in an automated cartridge handling apparatus, as well as to a method.

2. Description of the Related Art

It is desirable to provide automated handling of cartridges, such as data storage cartridges, for loading and unloading of the cartridges at tape cartridge drives and for storage of the cartridges in cartridge storage facilities. Proper orientation of the cartridges in the automated handling apparatus must be guaranteed for loading of the cartridge into the drive. An improperly oriented cartridge will cause problems if loaded into the drive. For example, if the cartridge is positioned back-for-front, the automated loading apparatus may not detect the mis-orientation prior to attempting loading of the cartridge into the drive, resulting in a failure of the loading operation and possibly damage to the drive.

SUMMARY OF THE INVENTION

An apparatus and method is provided for assuring a predetermined orientation of a cartridge in a cartridge storage magazine. For example, a projection is provided within a cartridge storage space for preventing full insertion of a mis-oriented cartridge. Embodiments of the invention find utility in automated cartridge handling devices, such as for loading and unloading of cartridges into cartridge drives.

BRIEF DESCRIPTION OF THE DRAWINGS

FIG. 3 is a perspective view of two storage magazine slots having positioned therein a cartridge in a proper orientation and a cartridge in an incorrect orientation, respectively;

FIG. 4 is a rear perspective view of the two magazine storage slots of FIG. 3;

DETAILED DESCRIPTION OF THE PREFERRED EMBODIMENTS

The following detailed description sets forth exemplary embodiments without limitation to the scope of the invention as defined in the claims.

Figure 1:
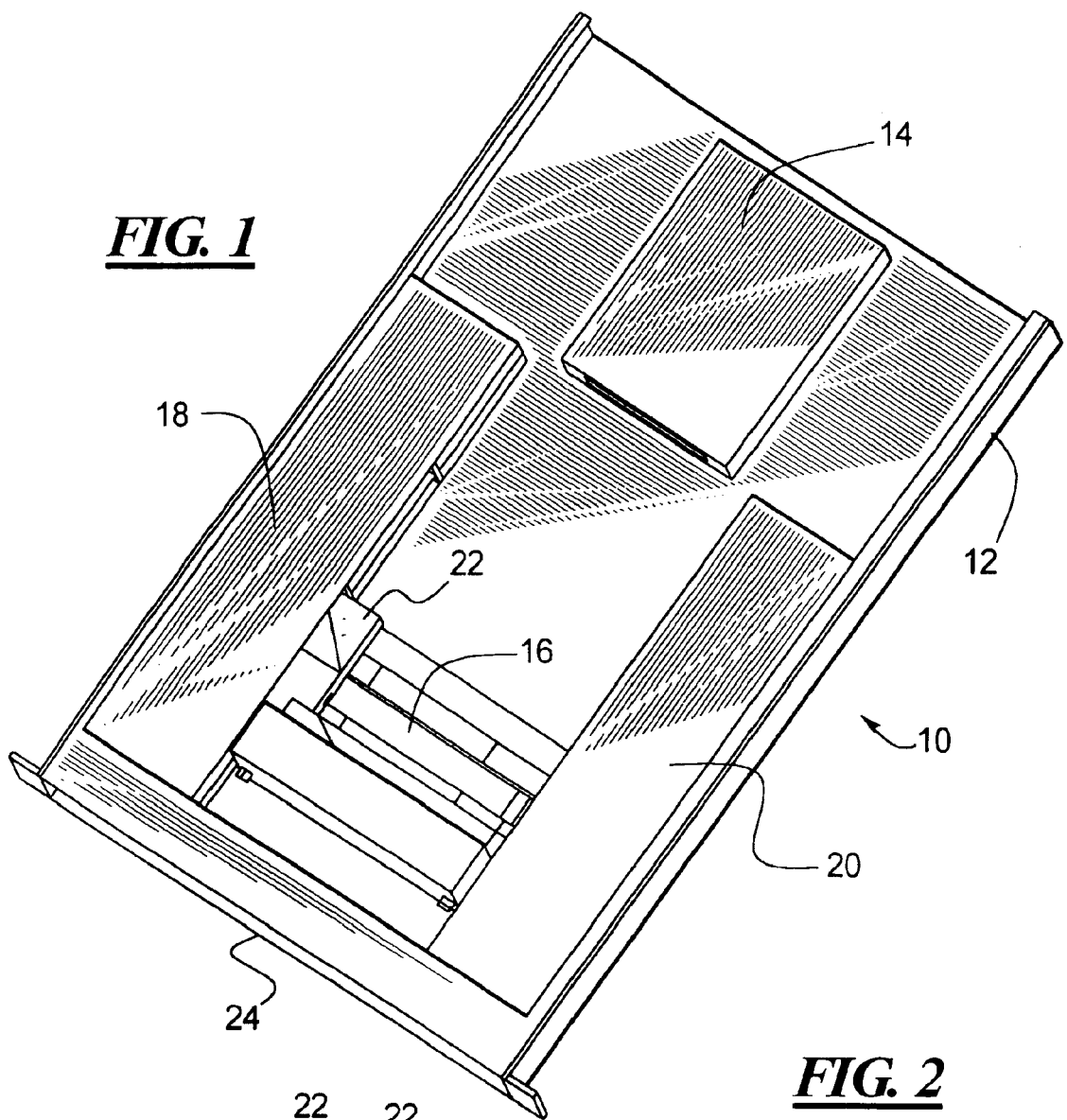
FIG. 1 is a plan view of an automated cartridge handling apparatus.

With reference first to FIG. 1, an automated cartridge handling apparatus 10 is shown, including a housing 12 which encloses a tape drive 14 for recording and playback of magnetic tape cartridges 22. Transfer of the magnetic tape cartridges 22 into and out of the recording drive 14 is accomplished by a cartridge handling shuttle 16. The cartridge handling shuttle 16 is positioned between two cartridge storage magazines 18 and 20 and is capable of movement to access the drive 14 and the storage slots in the magazines 18 and 20. The cartridge handling shuttle 16 selectively removes a cartridge 22 from a storage slot in the storage magazine 18 or 20 and transfers it into a load opening in the drive 14. Data or other information is either recorded onto a tape in the cartridge 22 or is read from the tape in the cartridge 22 by the drive, or both, and the cartridge 22 is then removed from the drive 14 and moved by the cartridge handling shuttle 16 into a storage slot in the storage magazine 18 or 20.

Instead of storing the cartridge 22 in the magazine 18 or 20, the cartridge 22 may be carried to the end 24 by the shuttle 16 where it may be removed via a mail slot 26 opening at the end 24. A cartridge 22 may also be inserted via the mail slot 26 for receipt by the shuttle 16. The mail slot 26 is sized to accommodate a single cartridge 22 and preferably has a hinged door which keeps the opening closed when not in use. This permits single cartridges 22 to be inserted or transferred out.

It may be necessary to load multiple cartridges into or out of the device, which is accomplished according to one embodiment by removal and replacement of the storage magazines 18 and 20. Further openings 28 are provided in the end 24 through which the storage magazines 18 and 20 are removed. The openings 28 permit each of the magazines 18 and 20 to be removed for filling without removing the device from its mounting rack. A door is provided over each of the openings 28 which is normally closed. The openings 28 are of a size so that the magazine 18 or 20 may fit therethrough when empty or when the magazine contains fully inserted cartridges 22, but the magazine will not fit through the opening 28 if a cartridge 22 is not fully inserted into the magazine 18 or 20. This prevents improperly loaded magazines 18 or 20 from being put into the device, as will become apparent hereinafter.

In the illustrated example, the storage magazines 18 and 20 each include eight storage slots, arranged two high by four wide. A single drive 14 is provided in the housing 12. It is, of course, possible that the storage magazines 18 and 20 may be wider or narrower, taller or shorter, having more or less storage slots. It is also contemplated that a storage magazine may be provided on only one side of the cartridge handling shuttle 16. It is further contemplated to provide additional tape drive units 14, for example, stacked one above another.

Figure 2:
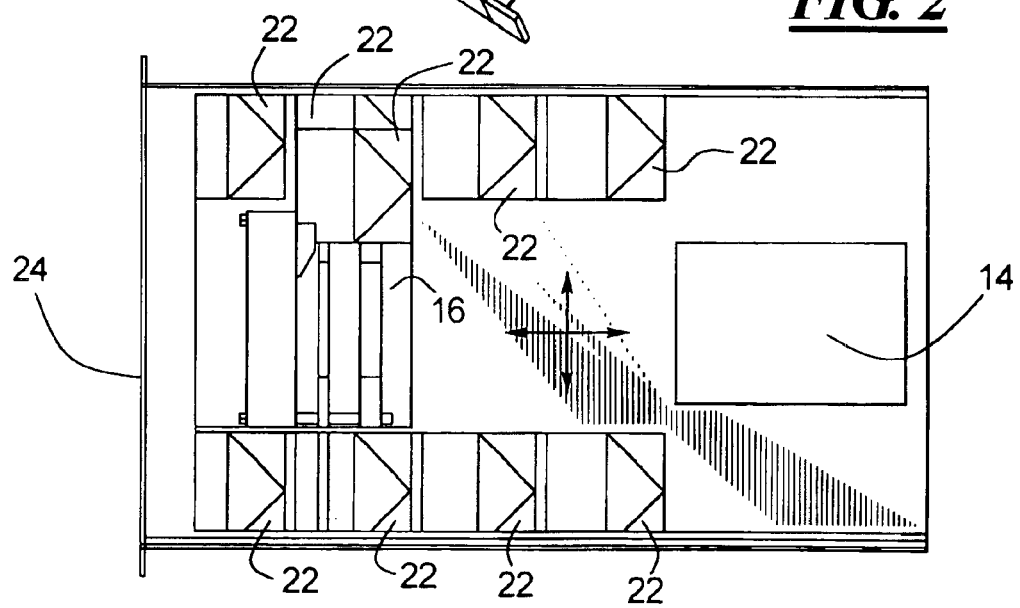
FIG. 2 is a schematic diagram of the automated cartridge handling apparatus of FIG. 1.

With reference to FIG. 2, the cartridges 22 are shown in the relative positions where they are stored in the storage magazines 18 and 20. For proper loading of the cartridges into the drive 14, the cartridges 22 must have a pre-defined orientation as indicated by the arrow on the cartridges 22. The cartridge handling shuttle 16 of the present embodiment is unable to determine the orientation of the cartridge and so may attempt to load the improperly oriented cartridge into the drive. An improperly oriented cartridge 22 will not work if loaded into the drive 14, and may even cause problems. For example, if the cartridge 22 is positioned back-for-front when loaded into the drive, the drive may jam or fail. The present invention helps to prevent this, by ensuring proper orientation of the cartridges 22.

In FIG. 3 is shown two of the storage slots of the storage magazine 18 of FIG. 1. Each of the two storage slots 30 and 34 has contained therein a cartridge 22. In the first storage slot 30, the cartridge 22a is oriented in the proper orientation for later insertion into the tape drive 14. According to the invention, the cartridge 22a is fully inserted into the slot 30 and a snap 32 engages a top corner edge of the cartridge 22a to lock the cartridge 22a in place.

On the other hand, the storage slot 34 has the cartridge 22b inserted in an opposite orientation, i.e. back for front. An attempt by the shuttle 16 to load this cartridge 22b into the drive 14 would result in failure of the device and possibly damage. According to an embodiment of the invention, the cartridge 22b is prevented from being fully inserted into the storage slot 34. The snap lock 32 for the slot 34 is prevented from engagement with the top corner edge of the cartridge 22b.

For example, when the magazine 18 is removed from the housing 12 through the opening 28 and is being loaded with cartridges 22, the cartridges are prevented from being improperly loaded in a fully inserted position into the storage slots. Only properly oriented cartridges 22 can be fully inserted into the slots. Thus, during the manual cartridge loading of the magazine, the cartridges may not be fully inserted in the wrong orientation. The disclosed embodiment prevents human error during the manual loading of the magazine from resulting in a subsequent failure of the device due to an improperly oriented cartridge.

The dimensions of the opening 28 in the front panel 24 of the housing 12 is such that it can only accept magazines into which the cartridges are fully inserted, and thus properly oriented. Any cartridge which has an improper orientation and so projects from the magazine would cause the magazine to not fit into the magazine loading opening 28.

The front loading of the magazines 18 and 20 enables the magazines to be removed, emptied of cartridges, refilled, and re-inserted into the apparatus without un-mounting of the present apparatus, such as from a mounting rack.

In FIG. 4 is shown a rear view of the two storage slots 30 and 34 of FIG. 3 with the cartridges 22a and 22b positioned therein. A back wall of the storage magazine 18 is indicated in phantom so that an alignment projection 36 which extends into each of the slots 30 and 34 is visible. The projections 36 are positioned with an extension 38 directed upwardly. In this position, the projection 36 extends into a recess 40 in a side of the cartridge 22a. This permits the cartridge 22a to be inserted fully into the slot 30 so that the snap lock 32 engages. The cartridge 22b, on other hand, is inserted into the slot 34 in an incorrect orientation and the side face of the cartridge 22b strikes the extension 38 of the projection 36 to prevent the cartridge 22b from being fully inserted into the slot 34. The cartridge 22b has a recess 42 on the side face in the vicinity of the projection 36; however, since the projection 36 is oriented with the part 38 extending upwardly, that the projection 36 does not fit into the recess 42. This prevents the cartridge 22b from being engaged by the snap lock 32.

Figure 5:
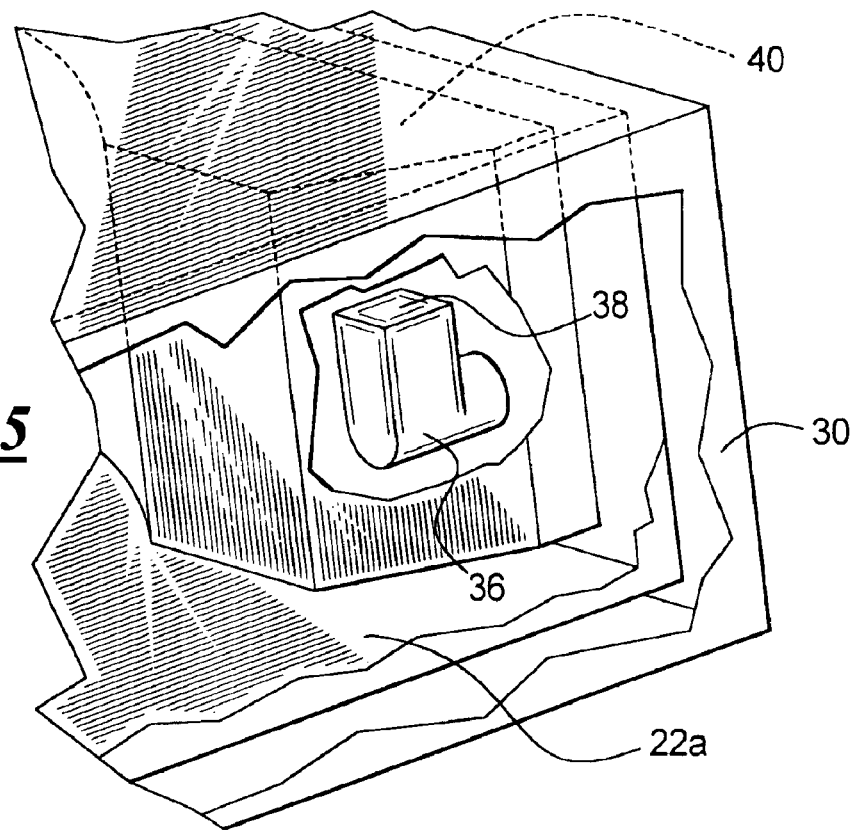
FIG. 5 is an enlarged perspective view showing in phantom the cartridge alignment structure in a first orientation.

In FIG. 5, a close-up view of the projection 36 shows the upwardly directed extension 38. The projection 36 fits into the recess 40 in the cartridge 22a. The cartridge is able to be fully inserted into the slot 30 in the storage magazine 18.

Figure 6:
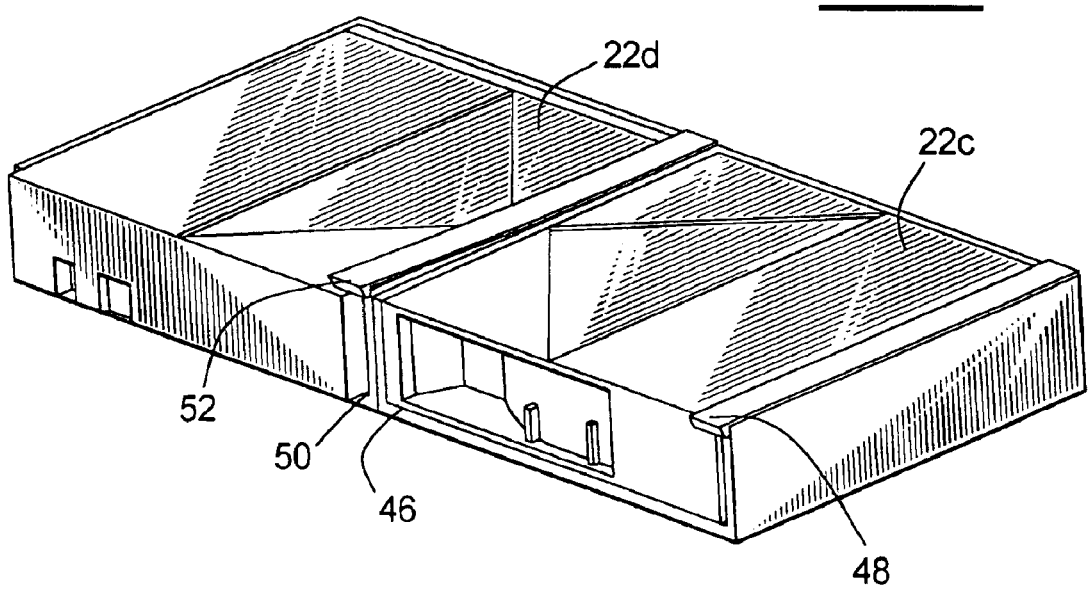
FIG. 6 is a front perspective view of two storage slots of a second storage magazine having positioned therein a cartridge in a correct orientation and a cartridge in an incorrect orientation, respectively.

FIG. 6 shows the storage magazine 20 on the other side of the automated cassette handling shuttle 16. The storage magazine 20 requires that the cartridges 22 be oriented in the opposite direction from the storage magazine 18 shown in the preceding FIGS. 4 and 5. In this magazine, a cartridge 22c is properly oriented and fits fully into a slot 46 in the storage magazine 20 so that it is fully engaged by the snap lock 48. By contrast, the cartridge 22d is oriented in the opposite direction and is prevented from being fully inserted into the slot 50 of the storage magazine 20 so that the snap lock 52 is not engaged on the edge of the cartridge 22d.

Figure 7:
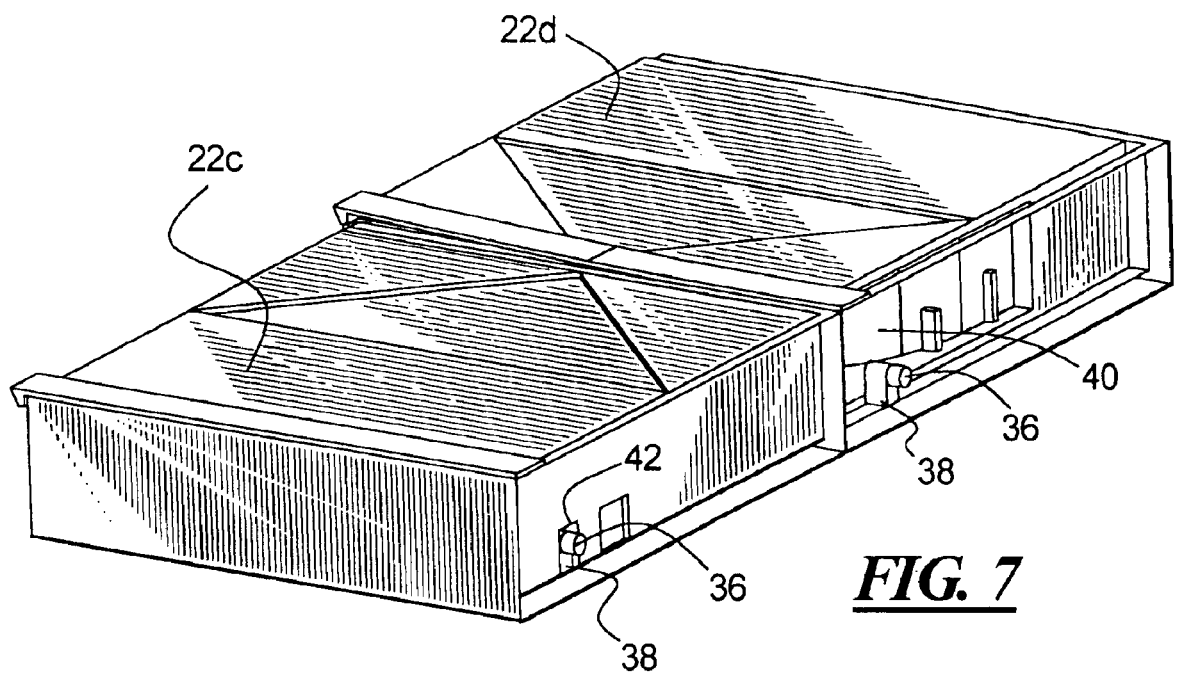
FIG. 7 is a rear perspective view of the storage magazine of FIG. 6 showing the alignment structure in a second orientation.

In FIG. 7 is shown the back side of the magazine storage slots 46 and 50 in which the projection 36 is shown extending into the slots from the back wall. The projection 36 is oriented with the extension 38 extending downwardly. This permits the projection 36 to fit into the recess 42 on the cartridge 22c. This permits the cartridge 22c to be fully inserted into the slot so that the snap lock 48 engages the cartridge 22c. On the other hand, the cartridge 22d has a lower edge portion 54 adjacent the recess 40 which strikes the extension 38 and prevents the cartridge 22d from being fully inserted into the slot 50. Thus, the snap lock 52 is prevented from engagement with the cartridge 22d.

Figure 8:
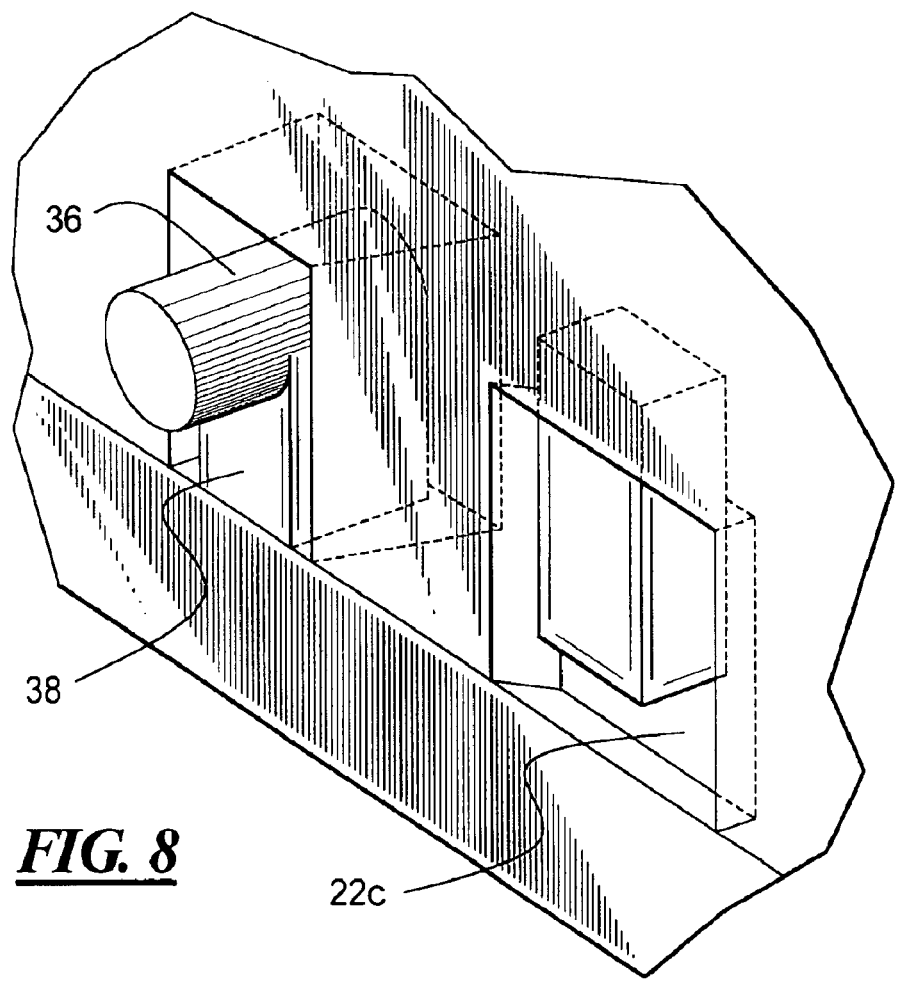
FIG. 8 is an enlarged view in perspective showing the alignment structure in the second orientation.

In FIG. 8, the projection 36 with the extension 38 is shown extending into the recess 42 in the cartridge 22c to permit the cartridge 22c to be fully inserted into the storage slot 46.

The projection 36 is a separate part that may be inserted into the storage magazines in the appropriate orientation during assembly of the magazines. Alternately, the projections 36 may be inserted in the appropriate orientation at a later time. A further embodiment provides that the projections 36 may be removable for repositioning depending on whether the storage magazine is to be used to the right or the left of the shuttle. In an alternative embodiment, rotation of the projection element 36 between the two illustrated positions. The use of the projection 36 which is mounted in either position permits the same structural element can be used to provide either the left or the right storage magazine 18 or 20, so that no additional parts are required nor any special manufacturing process other than positioning the projection 36 in either a downwardly directed or upwardly directed orientation.

According to the illustrated embodiment, a cartridge 22 which is loaded into the apparatus 10 facing in the wrong direction or with an improper orientation to be loaded into the tape drive 14 will not successfully load into the storage slots of the magazines 18 and 20 and will be detected so that the cartridge 22 can be removed and re-oriented.

Although the disclosed embodiment is particularly useful for manually loaded magazines, it is also contemplated that the automated apparatus may determine the presence of an improperly oriented cartridge and may either avoid using the improperly oriented cartridge or may eject it from the device, such as through the mail slot. Such a mis-oriented cartridge may result from an improperly positioned cartridge being positioned into the mail slot, or from slippage of the handling apparatus within the device.

It is contemplated that the present invention be used in storage magazines not associated with automated handling apparatus. It is further contemplated that fewer than all storage slots may be provided with the projection, so that orientation of a cartridge may be checked by inserting the cartridge into the storage slot having the projection of the invention. It is further contemplated that the projection need not be mounted in a storage slot, but may be provided at an orientation testing location, such as at the cartridge introduction slot of the cartridge handling apparatus.

Thus, there is described and shown an apparatus and method that insures correct orientation of cartridges for proper loading and handling of the cartridges, such as in an automated cartridge handling apparatus.

Although other modifications and changes may be suggested by those skilled in the art, it is the intention of the inventors to embody within the patent warranted hereon all changes and modifications as reasonably and properly come within the scope of their contribution to the art.

We claim:

1. A cartridge storage magazine comprising:

walls defining slots for storage of a cartridge;

a projection extending from a rear wall inside at least one of said slots for extension into a recess in the cartridge if the cartridge is inserted into the slot in a first orientation, said projection blocking full insertion of the cartridge in the storage slot if the cartridge is in a second orientation, wherein said projection is re-positionable from said first orientation to said second orientation so that when said projection is in the second orientation, the cartridge is insertable fully into the slot in a second orientation but not in the first orientation.

2. A cartridge storage magazine as claimed in claim 1, further comprising:

an apparatus mounted on the storage magazine to determine if the cartridge is fully inserted into the storage slot as distinguished from the cartridge being incompletely inserted into the storage slot.

3. A cartridge storage magazine as claimed in claim 2, wherein said apparatus is a snap lock.

4. Cartridge storage magazines, comprising:

a plurality of cartridge storage magazines in first and second magazine orientations, said first magazine orientation of said cartridge storage magazine accepting cartridges in a first cartridge orientation and said second magazine orientation of said cartridge storage magazine accepting cartridges in a second cartridge orientation, said cartridge storage magazines including:

walls defining a plurality of storage slots into which the cartridges are positionable for storage;

a projection extending from a rear wall of the storage slots into an interior of the storage slots, said projection being positioned in a first projection orientation for said storage magazine of said first magazine orientation and said projection being positioned in a second projection orientation for said storage magazine in said second magazine orientation, said projection blocking full insertion of the cartridges into the storage slots of said first storage magazine when the cartridges are in said second cartridge orientation but permitting insertion of the cartridges into the first storage magazine when the cartridges are in said first cartridge orientation, and said projection in said storage slots of said second storage magazine blocking full insertion of the cartridges into the storage slots when the cartridges are in said first cartridge orientation but permitting full insertion of the cartridges into the storage slots when the cartridges are in said second cartridge orientation.

5. Cartridge storage magazines as claimed in claim 4, wherein said first and second storage magazines are positioned opposite one another with the storage slots facing one another.

6. Cartridge storage magazines as claimed in claim 4, further comprising:

locking catches on each of said storage slots of said first and second storage magazines for engagement with the cartridges upon full insertion of the cartridges into the storage slots.

7. An automatic cartridge handling apparatus comprising:

a cartridge drive, a cartridge moving shuttle and first and second cartridge storage magazines, said first and second cartridge storage magazines including walls defining a plurality of cartridge storage slots;

a projection extending into the storage slots from a back wall of the storage slots so that properly oriented cartridges fit fully into the storage slots but improperly oriented cartridges only incompletely fit into the storage slots, said projection being re-positionable from a first position to a second position, said storage slots of said first storage magazine having said projection in said first orientation and said storage slots of said second magazine having said projection oriented in said second orientation.

8. A method for determining orientation of a cartridge, comprising the steps of:

providing a cartridge storage slot;

providing a projection extending into said cartridge storage slot, said projection fitting into a recess of the cartridge if the cartridge is in a first orientation to permit full insertion of the cartridge, said projection blocking full insertion of the cartridge if the cartridge is in a second orientation; and engaging the cartridge with a lock if the cartridge is fully inserted into the storage slot; and repositioning said projection to accept full insertion of the cartridge in the second orientation.

* * * * *